United States Patent [19]

Nilsson

[11] Patent Number: 4,558,832
[45] Date of Patent: * Dec. 17, 1985

[54] TAKE-UP MECHANISM FOR SAFETY BELTS

[75] Inventor: Karl E. Nilsson, Ottobrunn, Fed. Rep. of Germany

[73] Assignee: Bayern-Chemie Gesellschaft für flugchemische Antriebe mit beschrankter Haftung, Fed. Rep. of Germany

[*] Notice: The portion of the term of this patent subsequent to Apr. 2, 2002 has been disclaimed.

[21] Appl. No.: 489,091

[22] Filed: Apr. 27, 1983

[30] Foreign Application Priority Data

Apr. 29, 1982 [DE]  Fed. Rep. of Germany ....... 3215925

[51] Int. Cl.$^4$ ........................ A62B 35/00; B65H 75/48
[52] U.S. Cl. ............................ 242/107; 242/107.4 R; 280/806
[58] Field of Search .......... 242/107, 107.4 R–107.4 E; 280/806; 297/478, 480

[56] References Cited

U.S. PATENT DOCUMENTS

| | | | |
|---|---|---|---|
| 3,389,873 | 6/1968 | Filippi et al. | 297/478 X |
| 4,423,846 | 1/1984 | Fohl | 242/107 |
| 4,508,288 | 4/1985 | Nilsson | 242/107 |

FOREIGN PATENT DOCUMENTS 2262889  7/1974  Fed. Rep. of Germany .

Primary Examiner—John M. Jillions
Attorney, Agent, or Firm—McGlew and Tuttle

[57] ABSTRACT

A take-up mechanism for safety belts in vehicles comprises an automatic belt winding assembly which is connected to a windup assembly which includes a motor having a piston which rotates relative to an associated cylinder to drive the belt winding assembly in a direction to tighten the belt, for example when an emergency arises such as a potential accident. The drive motor includes a piston having a vane portion rotatably mounted in a cylinder so that either the piston or the cylinder is rotatable for a short rotation period upon the ignition of a pyrotechnical drive charge which when ignited provides a propellent for driving the motor. The construction of the mechanism is such that kinetic energy stored in the rotating masses of a clutch are used to effect a positive coupling of the take-up mechanism with the shaft carrying the wound up seat belt. The drive motor thus has a limited rotational path which is shorter than the length of the belt portion to be retracted. The clutch mechanism is such that it locks during the windup operation and then disengages in the manner of an overrunning clutch.

4 Claims, 15 Drawing Figures

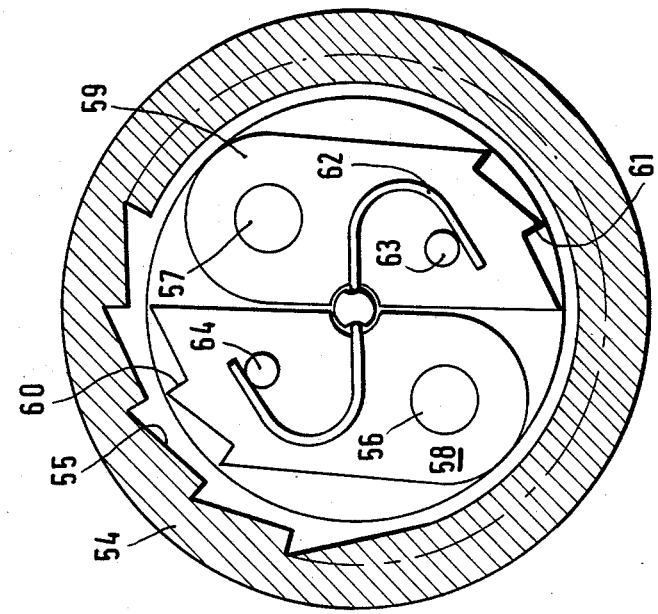
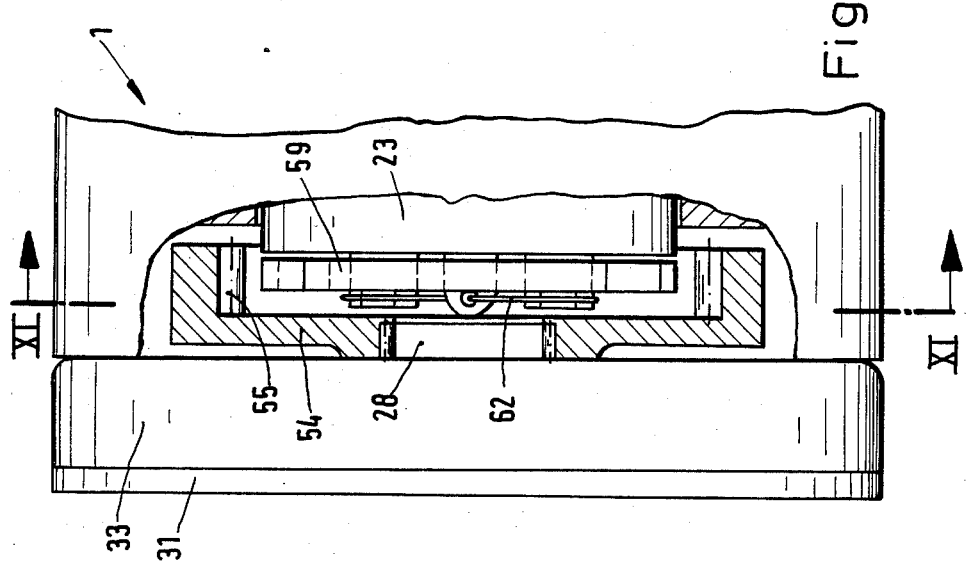

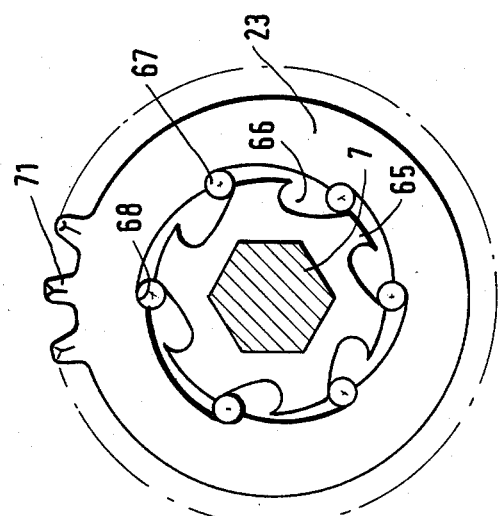
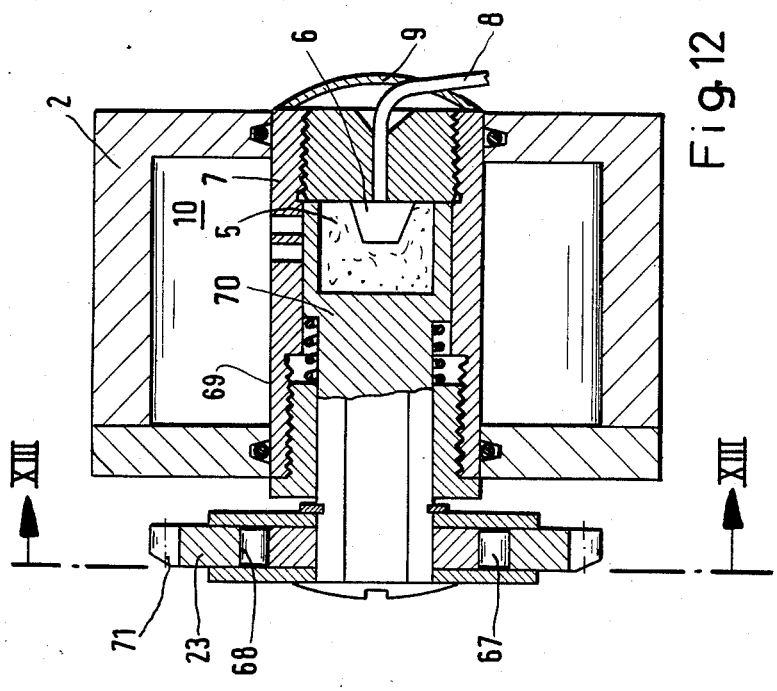

TAKE-UP MECHANISM FOR SAFETY BELTS

FIELD AND BACKGROUND OF THE INVENTION

This invention relates in general to vehicle safety devices and in particular to a new and useful windup mechanism for a safety belt which is engaged on an automatic belt winding assembly.

Windup mechanisms serve the purpose of taking up a slack of a safety belt at an impact of the vehicle, by winding up the belt and thus minimizing the free hurl forward until the belt becomes effective.

A take-up mechanism for winding up belt has to meet three requirements. It must be capable of compensating for an existing slack (such as of 20 cm), it must be small enough to be accommodated in the available space in the vehicle, and its design must permit subsequent mounting without, or with only a minimum adaptation, on existing automatic belt winding devices which are series-manufactured and thus adequately inexpensive.

German OS No. 22 62 889 discloses a winding device wherein the belt reel is formed by a rotary piston which is actuated by drive gases from a pyrotechnical charge. In this device, however, the rotary piston equipped with a vane can be rotated through only about 310° which is not sufficient for doing away from a larger slack of the belt.

Another belt winding device of the above kind with a windup mechanism equipped with a rotary piston-type of a motor is known from German AS No. 25 10 514. This rotary piston motor comprises two annular chambers which are bounded by a shaft, a cylindrical wall, and a front and a rear cover and separated from each other by an annular disc extending between the shaft and the cylindrical wall, and two vanes, one in each of the annular chambers, extending over the entire circumferential cross-sectional area of the respective chamber, with one vane in each of the annular chambers being firmly connected to the shaft and to the annular disc (first vane, second vane), and, in the front chamber, a third vane being firmly connected to the front cover, and in the rear chamber, a fourth vane being connected to the rear cover, and this cover being connected to the cylindrical wall. The gases produced by the drive charge pass through bores in the shaft into the two annular chambers, with, in the front chamber, the first vane, and in the rear chamber, the fourth vane being exposed to the gases and rotatable, independently of each other and along with the parts connected thereto, until the first vane butts against the third vane, and the fourth vane butts against the second vane.

It is true that a rotation of the belt reel through about 600° is thereby made possible, i.e. even a substantial slack can be removed, however, a relatively complicated rotary piston motor is required.

Further, in the same device according to German AS No. 25 10 514, the belt reel is mounted for rotation on a journal secured to the rotary piston motor and on a journal supported on the housing of the automatic belt winding mechanism. To form a positive clutch, the side disc facing the rotary piston motor belt reel is designed as a notched wheel cooperating with a pawl mechanism for blocking the automatic belt winding assembly, with the periphery of the side disc being provided with a plurality of bores into which bolts are engageable by the action of the drive gases of the charge, to couple the drive pulley of the motor to the belt reel. This augments the axial length of this device, relative to a conventional automatic belt winding unit, substantially only by the width of the rotary piston motor, however, due to the many differences over the existing automatic belt winding units manufactured in large series, a subsequent mounting of the pull-off mechanism thereon is not possible.

SUMMARY OF THE INVENTION

The invention is directed to an improvement of winding devices ensuring that the slack in a safety belt can be removed by means of a windup mechanism of simple design, which can be mounted on existing series-manufactured automatic winding units without or with a minimum of adaptation.

Due to the invention, a single-chamber rotary piston drive according to German OS No. 22 62 889 can be employed instead of a double-chamber rotary piston drive according to German AS No. 25 10 514. In such a design, the stroke angle of rotation of the piston is only about 300°, however, due to the provided overrunning clutch, the momentum produced by the ignition of the drive charge and transmitted to the rotating masses of the pull-off and the automatic winding mechanism is preserved as inertial energy by which the belt reel is further rotated through a sufficiently large angle.

The term "overrunning clutch" in this connection, is meant to define any blocking mechanism which is a locking effect only in one direction of rotation. Further, in a rotary piston drive, the rotary piston may execute the rotary motion with the rotary cylinder at standstill, or vice versa (stator-rotor principle).

Accordingly, it is an object of the invention to provide a device for tightening seat belts in a rapid manner which includes a clutch mechanism connected between the pyrotechnic charge operated motor and the seat belt winding reel and which is effective to produce a rotational stroke which acts on the reel through a clutch mechanism which has a rotatable mass so that after the driving motor imparts a rotational motion to it, it effects a locking of the drive for the belt reel which disengages in the manner of an overrunning clutch after the belt has been tightened.

A further object of the invention is to provide various type drive connections between a pyrotechnic motor and a take-up reel of a safety belt winding assembly.

A further object of the invention is to provide a take-up mechanism for seat belts which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIGS. 10 and 11 are partial longitudinal and cross-sectional views of a fourth embodiment of the overrunning clutch;

FIGS. 12 and 13 are similar views of a fifth embodiment of the overrunning clutch;

DESCRIPTION OF THE PREFERRED EMBODIMENTS

Figure 2:
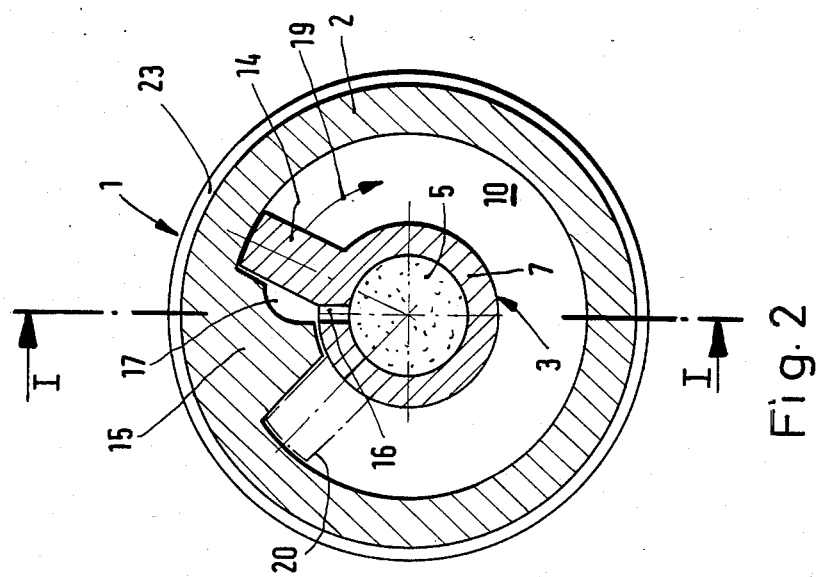
FIGS. 1 and 2 are longitudinal sectional and cross-sectional views of one embodiment of a windup mechanism of the winding device.

Referring to the drawings in particular the invention embodied therein comprises an automatic take-up mechanism generally designated 1 for safety belts in vehicles which comprises an automatic winding assembly and a belt windup device generally designated 26 which includes a belt reel shaft 28 which is connected to a belt roll 30 for winding up a seat belt 29. The take up assembly generally designated 1 comprises a motor which includes a cylinder 2 and a piston 3 which has a shaft portion 7 which is mounted for relative rotation in respect to the cylinder 2. An ignitable pyrotechnic charge means 5 is located within the cylinder 2 preferably within a hollow portion of the shaft 7 of the piston 3. Upon ignition of the drive charge 5, the relative rotation is produced between piston 3 and the cylinder 2.

In accordance with the invention a coupling is connected between the motor 1 and the shaft 28 of the belt reel of the belt winding or take up assembly 26. The coupling is in the form of an overrunning clutch having a rotatable mass which includes a drive pulley 23 which is engaged by a rope or drive member so as to drive the rotating mass of the clutch upon ignition of the charge and cause the clutch to lock into engagement with the reel and to rotate and store energy in the rotating mass which continues to rotate the reel until it is disengaged in the manner of an overrunning clutch.

Figure 1:
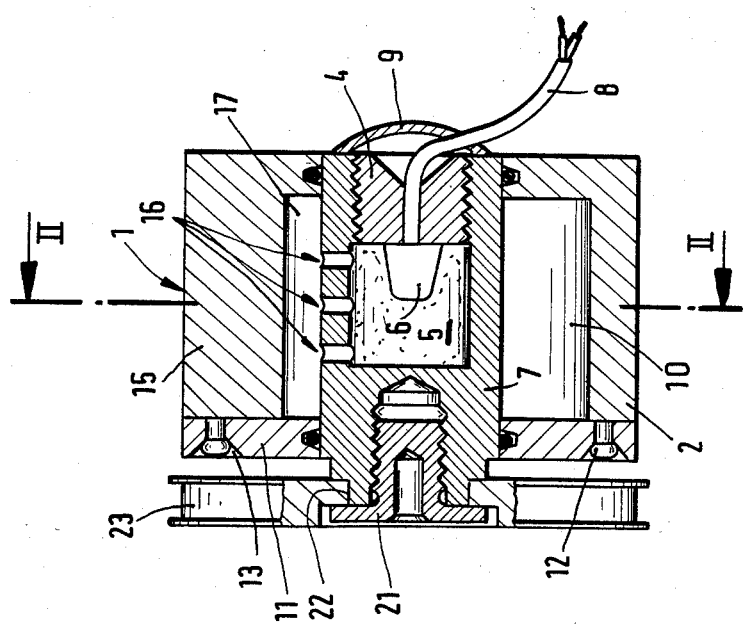

According to FIGS. 1 and 2, windup assembly 1 substantially comprises rotary cylinder 2, and rotary piston 3 mounted therein for rotation and designed as a single-vane rotary piston.

Within shaft 7 of the rotary piston 3, drive charge 5 and a fuse 6 are received and enclosed by a cover or plug 4. An ignition cable 8 extends from fuse 6 to the outside through plug 4 and a cap 9 by which the plug is covered. At the front side opposite to plug 4, an annular space 10 is closed by a cover 11. Cover 11 is connected to cylinder 2 advantageously by riveting pins 12, which are integral with the cover in countersinks 13 provided for this purpose. Vane 14 of piston 3 applies against an abutment 15 formed on the cylinder 2. Adjacent vane 14 of piston 3, bores 16 are provided in shaft 7 extending from drive charge 5 through the shaft into expansion space 17 of the annular chamber 10.

When drive charge 5 is ignited, drive gases are generated which pass through the bores 16 in the shaft 7 into the expansion space 17, which is bounded by the vane 14 and the abutment 15. The gases expand, whereby vane 14 of piston 3 is set in motion in the direction of arrow 19 in FIG. 2. The vane rotates through about 270° until it butts against the opposite side of abutment 15, i.e. reaches its end position 20 shown in dash dotted lines in FIG. 2.

Figure 4:
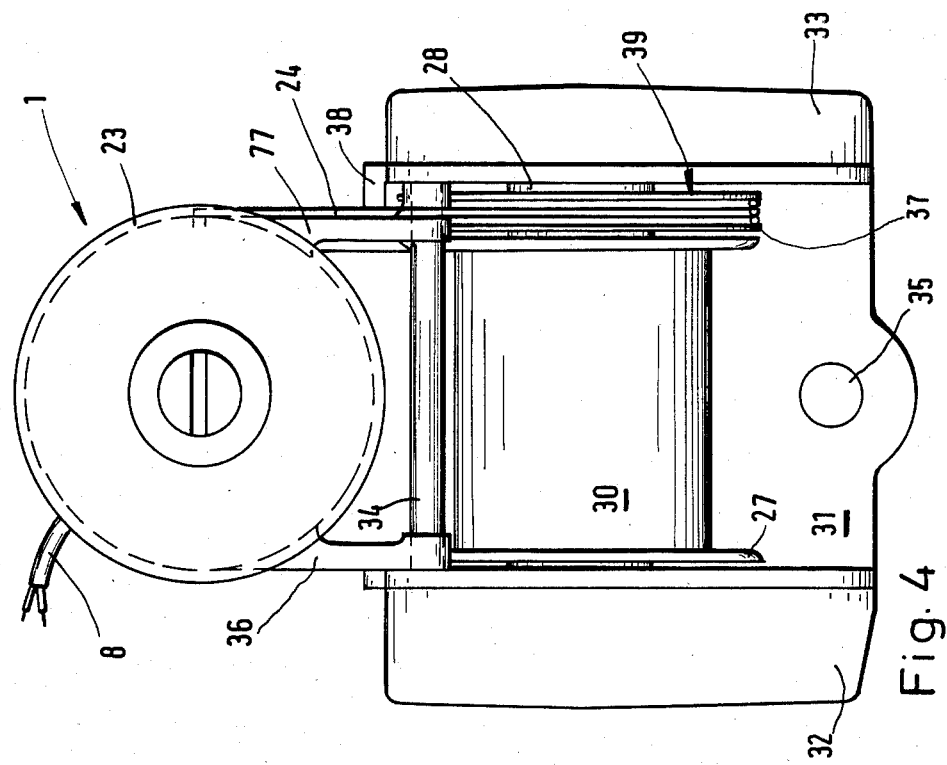
FIGS. 3 and 4 are a side view and a front view of a first embodiment of the winding device.
Figure 3:
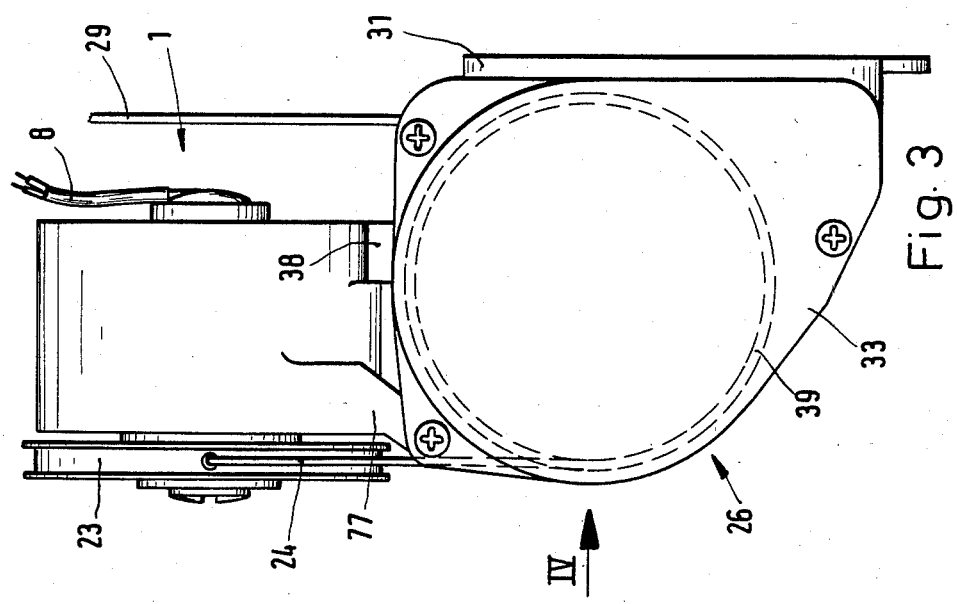

The drive pulley 23, which is connected to the shaft 7 of the piston 3 positively by a securing screw 21, is thereby taken along, and a force transmitting element, such as a rope 24 is attached by one of its ends to the drive pulley and is also wound on the pulley. In the embodiment of FIGS. 3 and 4, the windup assembly 1 and the drive pulley 23 are mounted above the automatic belt winding assembly 26.

Automatic belt winding assembly 26 is one of conventional design. In such a design, a belt reel 27, mounted on a shaft 28, carries a belt 29 wound to roll 30. Shaft 28 is mounted for rotation in a housing 31 and has a plate-shaped backwall. A blocking mechanism is protected by a cap 32, while the winding spring of the belt winding assembly 26 is accommodated in a casing 33. A spacer rod 34, to which the assembly 1 is secured, extends between cap 32 and casing 33, above belt reel 27.

The force transmitting element or rope 24 extends from drive pulley 23 to a coupling pulley 37 around which it is wound about 3 times. Between coupling pulley 37 and reel shaft 28, a positive clutch 39 of the overrunning type is provided.

Figure 5:
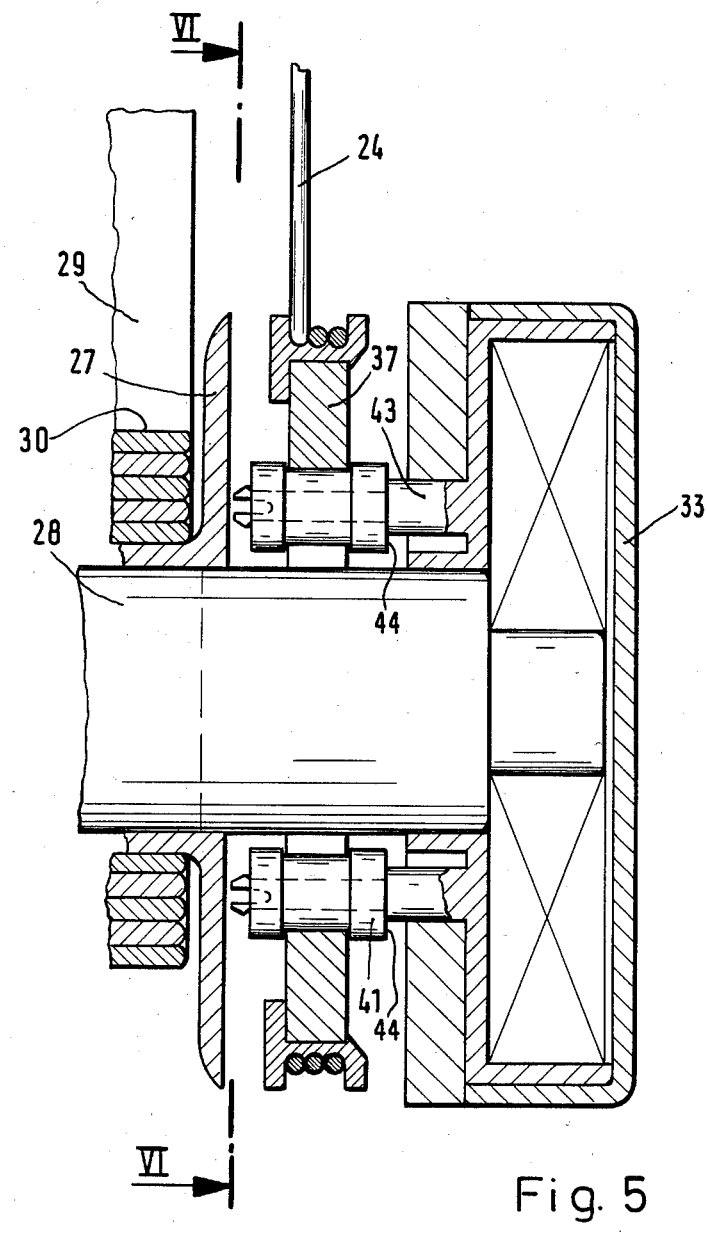
FIGS. 5 and 6 are longitudinal sectional and cross-sectional views of a first embodiment of the overrunning clutch.
Figure 6:
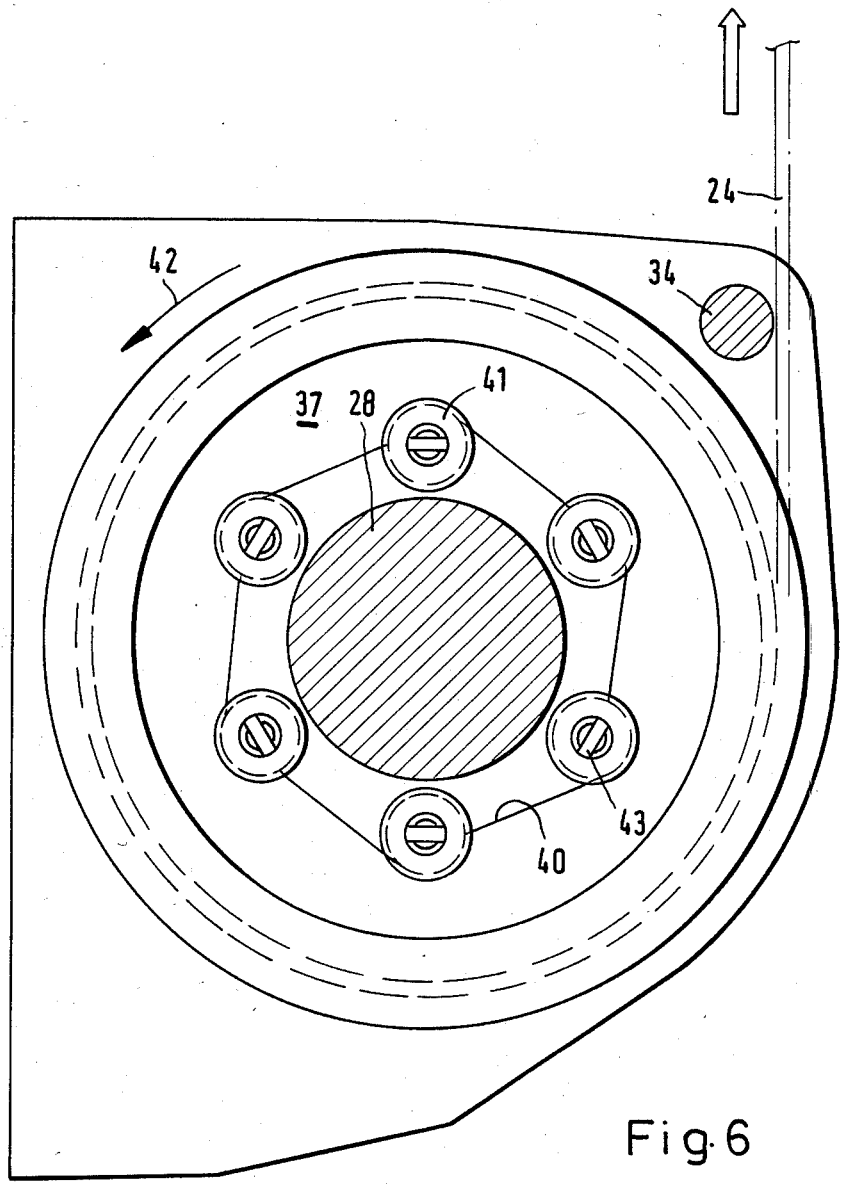

According to FIGS. 5 and 6, the overrunning positive clutch between the coupling pulley 37 and the reel shaft 28 is designed as a clutch with radially internal rollers. This means that a plurality of wedging recesses 40 is provided in coupling pulley 37 forming the external part of the overrunning mechanism, to which clamping rollers 41 apply. If coupling pulley 37 turns faster in the direction of arrow 42 in FIG. 6, than reel shaft 28, rollers 41 get wedged in recesses 40 and transmit the torque of coupling pulley 37 by friction to shaft 28, i.e. to lock shaft 28 to pulley 37. Conversely, if shaft 28 turns faster than coupling pulley 37, rollers 41 move out of their wedged position at recesses 40, i.e. shaft 28 becomes detached from coupling pulley 37, and the clutch is released.

Clamping rollers 41 are connected to spring casing 33 through holders 43 having predetermined break points 44. Holders 43 extend radially outwardly at fixed locations, to ensure a noiseless, firmly fixed position of coupling pulley 37 during normal operation of the automatic belt winding device.

If drive charge 5 has been ignited and drive pulley 23 winds up rope 24, coupling pulley 37 of the positive clutch is set in rotation. Clamping rollers 41 are sheared off at break points 44 and rollers 41 become wedged in recesses 40 against shaft 28. In this way, already after a few degrees of rotation, shaft 28 is taken along. The drive impulse of charge 5 is thus transmitted through rotary piston 3, drive pulley 23, rope 24, coupling pulley 37, and clamping rollers 41, to reel shaft 28. The windup operation is thereby started. As soon as rotary piston 3 has reached its end position 20, the acceleration phase is terminated. Piston 3 and drive pulley 23 then are abruptly stopped. Rope 24 is now wound off coupling pulley 37 which continues to turn by inertia. A great amount of energy is thus stored in reel shaft 28, due to the mass of pulley 37 and of the parts connected thereto. To utilize this energy, the overrunning clutch disengages, i.e. clamping rollers 41 are turned back into their initial positions, coupling pulley 37 stops and reel shaft 28 continues to freely rotate until the stored energy is converted into belt winding work. Then the normal blocking function of the automatic belt winding device takes over to prevent pay out of the belt 29.

Figure 8:
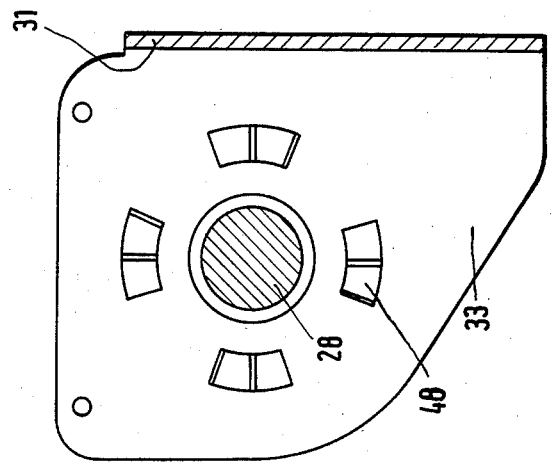
FIGS. 7 and 8 are partial longitudinal sectional and cross-sectional views of a second embodiment of the overrunning clutch.
Figure 7:
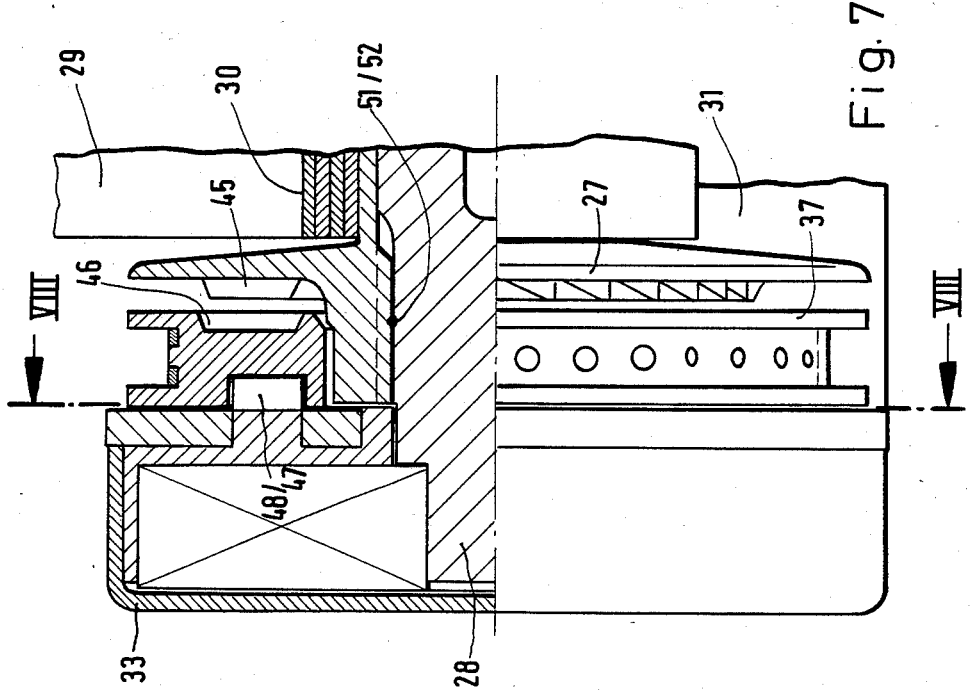
Figure 9:
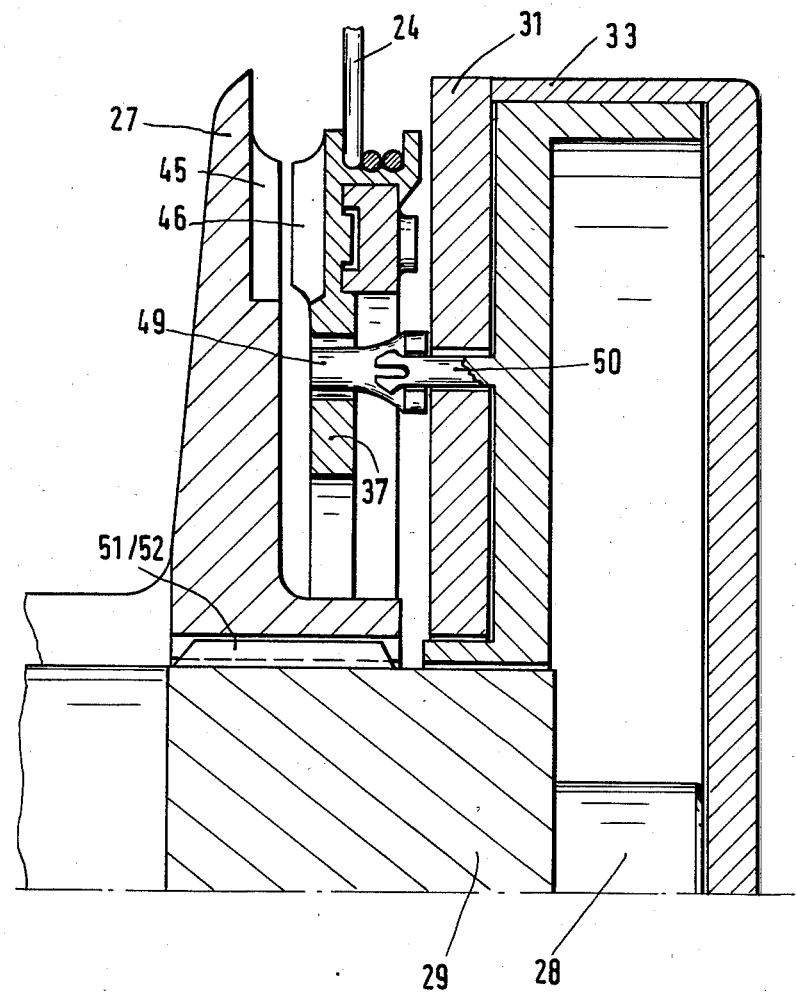
FIG. 9 is a partial sectional view of a third embodiment of the overrunning clutch.

In the embodiment of FIGS. 7 and 8, and with a design of the overrunning clutch in accordance with FIG. 9, the coupling pulley 37 is mounted for displacement on the reel shaft 28. Further, teeth 45 are provided on belt reel 27, at the side facing pulley 37, and pulley 37 is provided with corresponding teeth 46. The crests of teeth 45 and 46 extend radially. Teeth 45 and 46 have a sawtooth or buttress form i.e., each tooth has a perpendicular or radial flank, and an oblique flank.

According to FIGS. 7 and 8, coupling pulley 37 is secured to spring casing 33 by means of push grooves 47 slightly press-fitted onto drive teeth 48 provided on casing 33. Grooves 47 are provided over the entire circumference of pulley 37, while only four segments, of two teeth 48 each, are provided on casing 33, as shown in FIG. 8. Grooves and teeth 47,48 are engaged and shaped so that relative rotation of pulley 37 and casing 33 moves pulley 37 axially toward reel 27.

In the embodiment of FIG. 9, coupling pulley 37 is connected to spring casing 33 through obliquely extending guide arms 49 which are secured to button-shaped extensions 50 of casing 33.

Under conditions of normal operation of the automatic belt winding mechanism, teeth 45 and 46 in the two embodiments of FIGS. 7, 8 and 9 are disengaged from one another.

Upon igniting the drive charge 5, as the force transmitting element (not shown in FIGS. 7 and 9) is set in motion, coupling pulley 37 moves axially to the right according to FIG. 7 (or to the left according to FIG. 9), tha axial motion being effected by teeth and grooves 47,48, or by guide arms 49 which latter straighten and disengage from extensions 50. This causes teeth 45,46 to engage firmly with each other. Now reel shaft 28 is driven directly through a serration 51,52 and belt 29 is being wound up until the windup operation is terminated and automatic belt winding mechanism 26 has initiated the blocking effect.

In the embodiment of FIGS. 10 and 11, drive pulley 23 of rotary piston 3 of windup mechanism 1 is mounted coaxially with reel shaft 28 of automatic belt winding mechanism 26. At the shaft end facing drive pulley 23, a coupling cage 54 with internal teeth 55 in sawtooth form is provided while drive pulley 23 carries two coupling pawls a58,59 each being pivoted to a stud 56,57 and having engaging teeth 60,61. With drive pulley 23 at standstill, coupling pawls 58,59 are urged radially inwardly by springs 62 applied against projections 63,64 on the pawls.

Upon igniting drive charge 5, and after rotary piston 3 has rotated through a small angle (of about 5°), pawls 58,59 are pivoted by the centrifugal force and against the action of springs 62 outwardly so that they engage with internal teeth 55 of coupling cage 54 which is firmly secured to reel shaft 28. With the rotation of piston 3 terminated, reel shaft 28 and coupling cage 54 overrun pawls 58,59 which are thereby pushed back to their initial postions. Reel shaft 28 continues to rotate freely until the increasing force of the belt and the inertia force of the shaft and connected parts are brought into equilibrium.

In the embodiment of FIGS. 12 and 13, an overrunning clutch with radial external rollers is provided between shaft 7 of rotary piston 3 and drive pulley 23. For this purpose, an internal part 65 is keyed to shaft 7, having a plurality of gullet-shape recesses 66 in which wedging rollers 67 are engaged. With rollers 67 passing from recesses 66 into recesses 68 which are provided in drive pulley 23 and conformed to the outer diameter of the rollers, the clutch is locked, as may be learned from FIG. 13.

FIG. 12 shows that shaft 7 of rotary piston 3 comprises a piston 70 which piston is non-rotatably received for axial displacement in a cylinder 69 and is pushed out axially to the left upon ignition of drive charge 5. Drive pulley 23 is provided with external teeth 71. Consequently, with charge 5 ignited, drive pulley 23 is shifted through a small distance and coupled to a gear (not shown) for driving a reel shaft (not shown).

Since in this embodiment, the overrunning clutch is provided ahead of drive pulley 23, the energy accumulated by this pulley is utilized for the windup operation.

Figure 14:
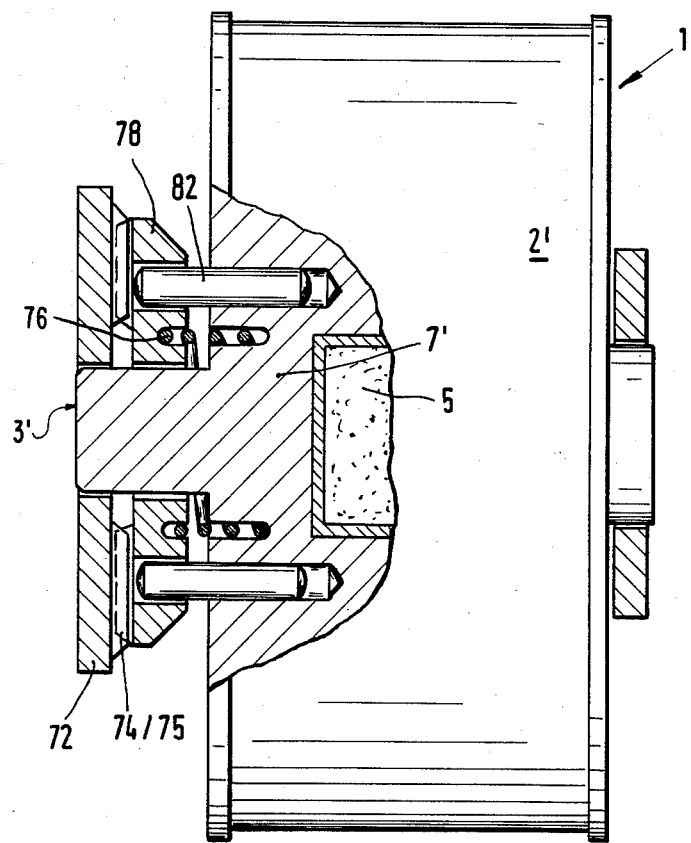
FIG. 14 is a partial longitudinal sectional view of a six embodiment of the overrunning clutch.
Figure 15:
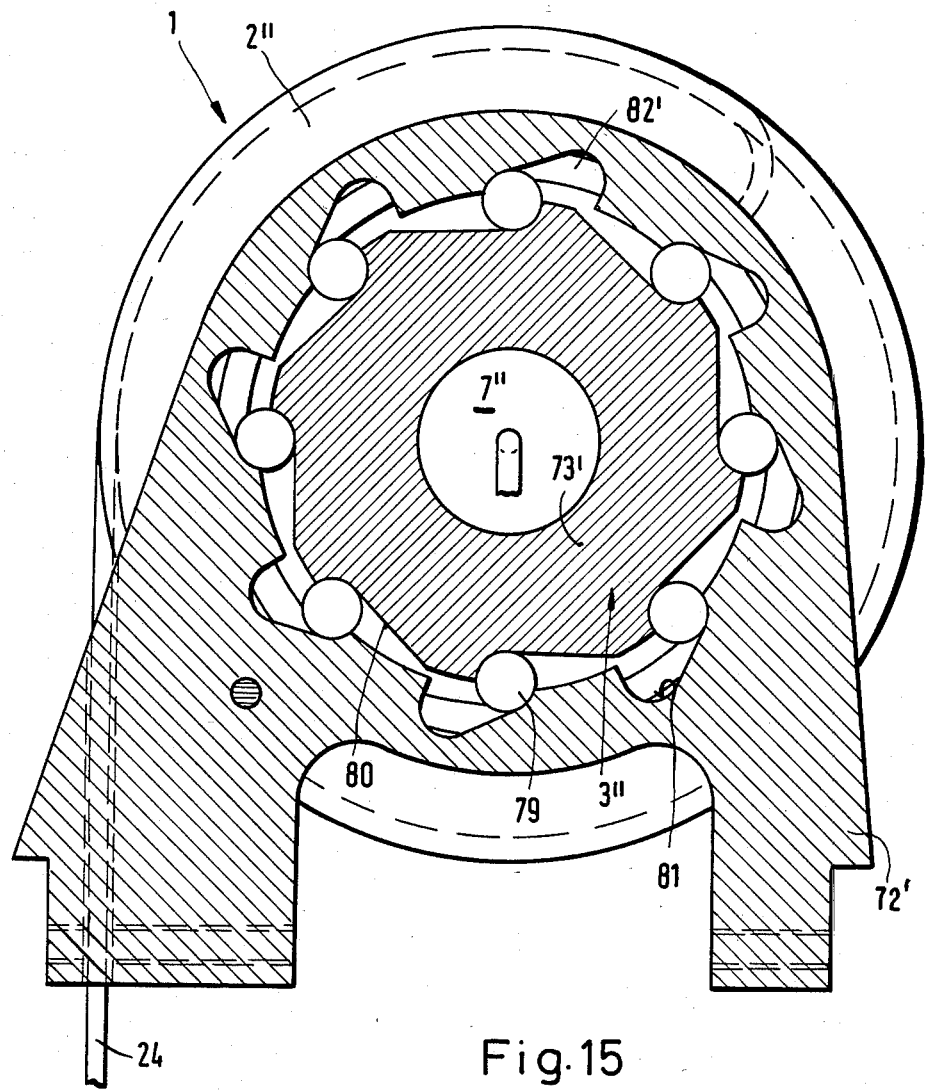
FIG. 15 is a sectional view of a seventh embodiment of the overrunning clutch.

In the embodiment of FIGS. 14 and 15, the force transmitting element or rope 24 is attached to the cylindrical surface of a rotary cylinder or casing 2'. Rotary piston 3' forms a bracing part of the rotary piston motor. Thus, in this embodiment, cylinder 2' is the rotary element, and rotary piston 3' is the bracing part which causes the cylinder to rotate when the change is effected. Further, an overrunning clutch is provided between rotary piston 3' and casing 72 of windup mechanism 1.

In the embodiment of FIG. 14, the overrunning clutch is formed by an axially displaceable disc 78 which is coaxial with shaft 7' of rotary piston 3' and non-rotatably secured thereto, and has sawtooth-shaped teeth 74 with radially extending crests, and by corresponding opposite teeth 75 provided on casing 72. Teeth 74 and 75 are urged into mutual engagement by a spring 76. Disc 78 is guided on pins 82.

In the embodiment of FIG. 15, an overrunning clutch with radially internal rollers is provided between rotary piston 3'' and casing 72' of mechanism 1. The inner parts 73' of the clutch is non-rotatably secured to shaft 7' of rotary piston 3''.

Upon igniting drive charge 5, the expanding drive gases turn rotary piston 3'' counterclockwise, as viewed in FIG. 15 and rotary cylinder 2'' clockwise. However, initially, rotary piston 3'' is stopped, through clamping rollers 79, by casing or frame 72'', i.e. it cannot rotate counterclockwise; instead, rotary cylinder 2'' having a force-transmitting element or rope 24 attached thereto is accelerated clockwise. As soon as the vane of rotary cylinder 2'' butts against the abutment of rotary piston 3'', piston 3'' is taken along in clockwise rotary motion by cylinder 2''. Clamping rollers 79 are thereby pushed by surfaces 80 into recesses 81 of frame 72', and the releasing effect is started. Rotary piston 3'' rotates freely along with rotary cylinder 2'' until the inertial energy is spent. The embodiment of FIG. 14 operates in a similar manner.

Clamping rollers 79 are made of a plastic and connected integrally to a ring 82'.

While specific embodiments of the invention have been shown and described in detail to illustrate the application of the principles of the invention, it will be understood that the invention will be embodied otherwise without departing from such principles.

What is claimed is:

1. A winding mechanism for safety belts in vehicles comprising:
   a take-up assembly having a frame, a reel rotatably mounted to the frame and a belt wound on the reel, the reel being rotatable in a belt winding direction to wind the belt on the reel;

a cylinder rotatably mounted to the frame and defining a space, said cylinder having an abutment extending radially to the space;

a rotary piston rotatably mounted to the cylinder and having a vane extending radially into said space and defining with said abutment a chamber;

a pyrotechnic charge in said radial piston, said radial piston having a passage communicating said pyrotechnic charge with said chamber so that said pyrotechnic charge can be ignited to supply pressurized gas to said charge to rotate said cylinder with respect to said piston;

an overrunning clutch connected between said radial piston and said frame for holding said radial piston in a rotatably fixed position when said pyrotechnic charge is ignited to apply pressurized gas to said chamber, and for allowing said radial piston to freely rotate in an opposite direction;

a coupling pulley engageable with said reel with rotation of said coupling pulley in the belt winding direction; and a tensioning element connected to said cylinder and wrapped around said coupling pulley for rotating said coupling pulley when said pyrotechnic charge is ignited and said cylinder rotates with respect to said piston.

2. A winding mechanism according to claim 1, wherein said overrunning clutch comprises an inner member fixed to said piston and an outer member fixed to said frame with a plurality of clamping rollers engaged between said inner and outer members.

3. A winding mechanism according to claim 2, wherein said rollers are made of plastic and including a ring made as a single part with said rollers.

4. A winding mechanism according to claim 1, wherein said overrunning clutch comprises a disc mounted for axial motion to said rotary piston, a plurality of guide pins engaged beteen said disc and said piston for permitting axial movement of said disc and for maintaining co-rotation between said disc and piston, said disc having saw-toothed shaped teeth extending radially on a surface thereof facing away from said piston, said frame having saw-toothed shaped teeth engaged with said teeth of said disc and biasing means biasing said disc towards said frame for engaging said teeth together, said teeth shaped to prevent rotation of said piston in one direction and permit rotation of said piston in an opposite direction with axial movement of said disc.

* * * * *